United States Patent [19]

Hansen

[11] Patent Number: 4,679,717
[45] Date of Patent: Jul. 14, 1987

[54] SPARE TIRE CARRIER

[76] Inventor: Dale G. Hansen, HC Box 14B, Star Valley, Ariz. 85541

[21] Appl. No.: 590,470

[22] Filed: Mar. 16, 1984

[51] Int. Cl.⁴ ............................................. B62D 43/00
[52] U.S. Cl. ................................ 224/42.06; 224/42.12
[58] Field of Search ................................ 414/462–466; 224/42.06, 42.12, 42.21; 296/37.2; 292/34.17

[56] References Cited

U.S. PATENT DOCUMENTS

| | | | |
|---|---|---|---|
| 1,495,371 | 5/1924 | Witten | 292/341.17 X |
| 1,504,992 | 8/1924 | Stewart | 292/341.17 |
| 2,699,568 | 1/1955 | Herscher | 292/341.17 X |
| 2,764,330 | 9/1956 | Dall | 224/42.21 |
| 2,776,791 | 1/1957 | Brundage et al. | 296/37.2 X |
| 3,326,434 | 6/1967 | Cheadle . | |
| 3,343,736 | 9/1967 | Selleks . | |
| 3,387,754 | 6/1968 | Sinkey et al. . | |
| 3,425,605 | 2/1969 | Triboulet | 224/42.06 |
| 3,669,326 | 6/1972 | Podraza | 224/42.21 |
| 3,753,520 | 8/1973 | Bodde | 224/42.06 |
| 3,804,308 | 4/1974 | Bodde | 224/42.06 |
| 4,189,074 | 2/1980 | Davies | 224/42.06 |
| 4,381,069 | 4/1983 | Kreck | 224/42.45 R X |

Primary Examiner—Stephen Marcus
Assistant Examiner—Robert Petrik
Attorney, Agent, or Firm—Jordan M. Meschkow

[57] ABSTRACT

A support arm is hingedly affixed at one end, for rotation about an upright axis, to a mounting plate secured to the bumper of a vehicle. A spare tire is demountably carried at the other end of the support arm. A latch assembly, including a handled lever carried by the support arm and a latch plate carried by the bumper, selectively retains the arm in a normal position in which the spare tire is parallel to an upright panel of the vehicle.

7 Claims, 7 Drawing Figures

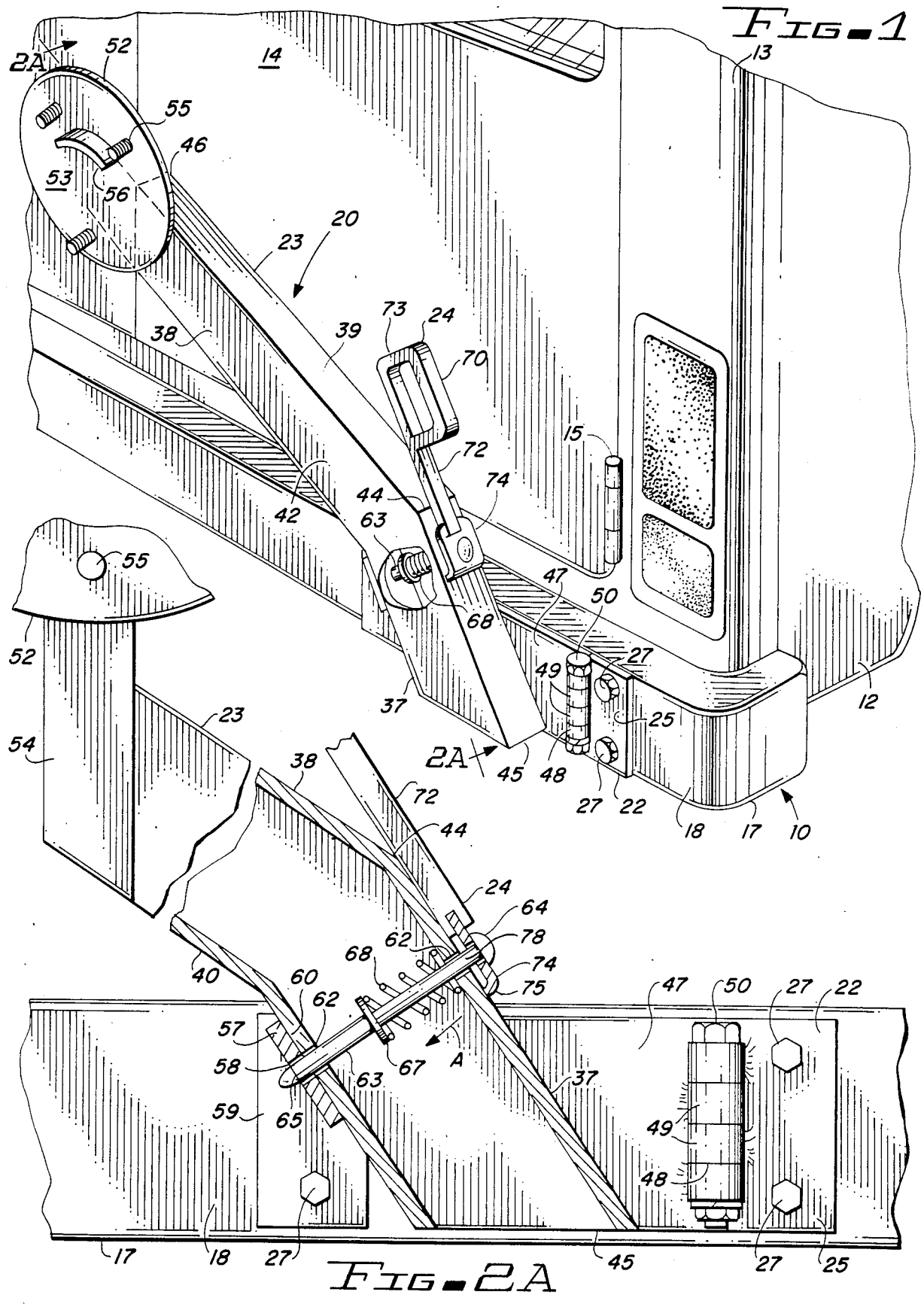

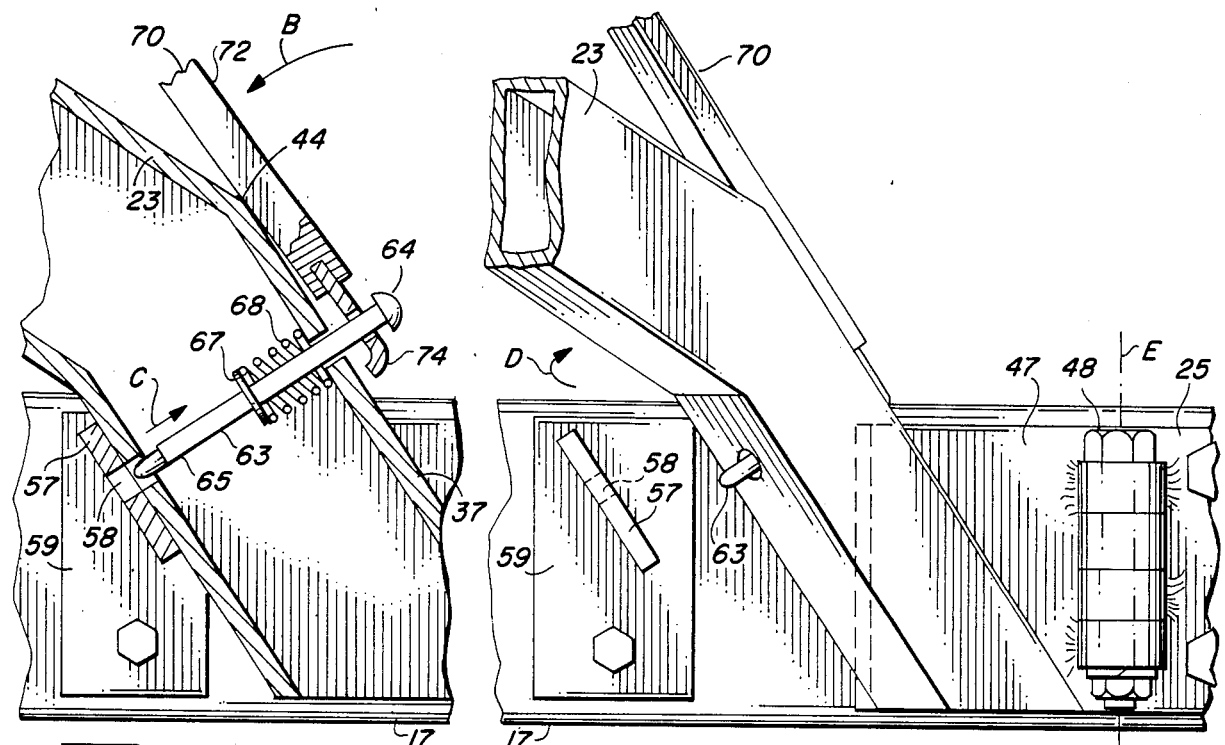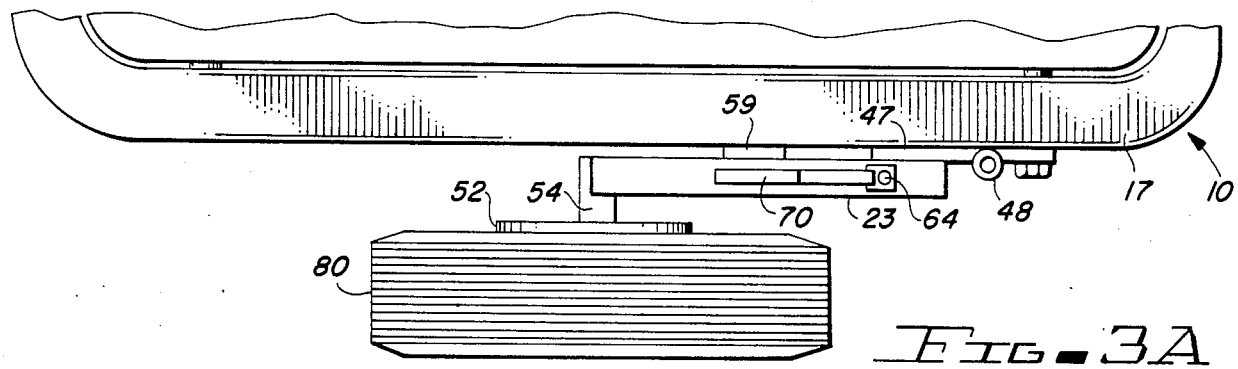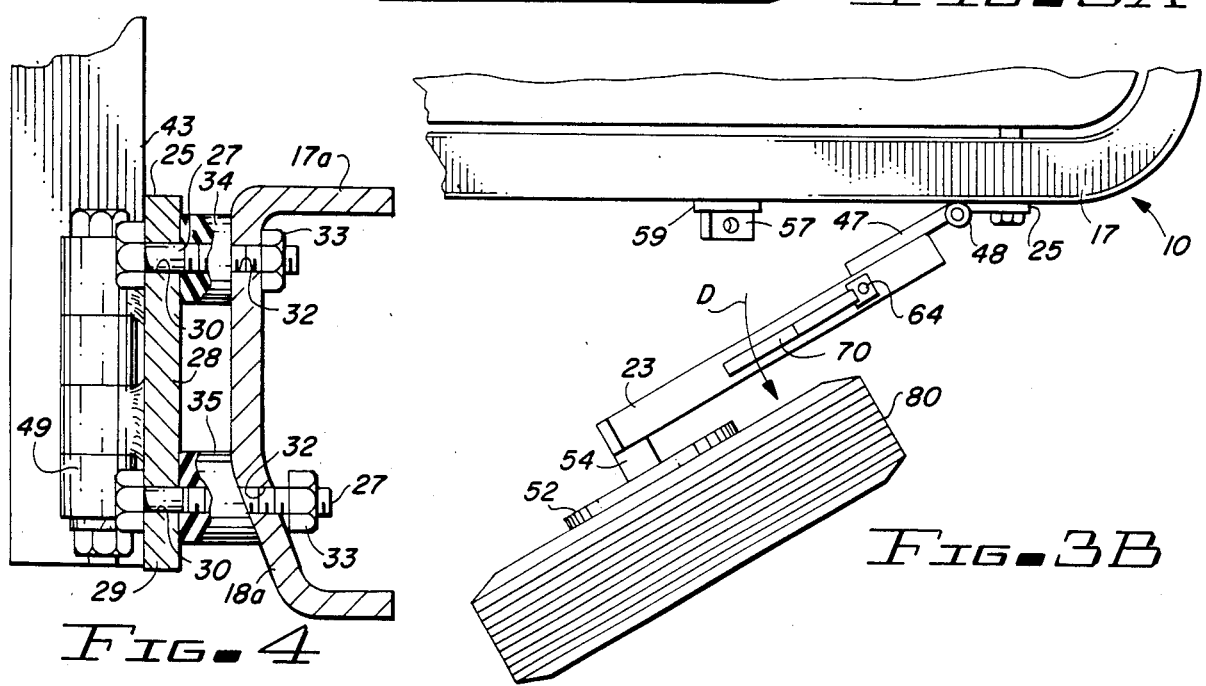

SPARE TIRE CARRIER

BACKGROUND OF THE INVENTION

1. Field of the Invention

This invention relates to improvements and accessories for vehicles.

More particularly, the present invention relates to exteriorly mounted spare tire carriers.

In a further and more specific aspect, the instant invention concerns an exteriorly mounted spare tire carrier which is supported by the frame of a vehicle.

2. Prior Art

The desirability and necessity of carrying a spare tire is well established. Conventionally, spare tires are included as original equipment with most vehicles.

As furnished by the manufacturer, spare tires are generally stowed in designated locations with regard to the specific type of vehicle. The spare tire in an automobile, for example, is conventionally located within the trunk or cargo compartment. In light trucks and derivative recreational and off-road vehicles, the spare tire is normally supported against the underside of the chassis. Various placement is employed for motor homes and travel trailers, including closet storage space.

Frequently, the placement selected by the manufacturer is inappropriate for the use intended by the consumer. Especially notable is the under-chassis placement on vehicles that are used for cross-country travel. The depending assemblage of tire and mount present an encumbrance that is readily snagged or caught upon brush, rocks, and other terrain obstacles, impeding progress and incurring damage to the vehicle. Interior storage space, on the other hand, is generally inconvenient and wasteful of precious cargo space.

In recognition of the foregoing limitations and problems, the prior art has devised numerous purported solutions. Commonly, suggested remedies include locating the spare tire adjacent an exterior panel of the vehicle. The resultant mounting structures, or carriers, are variously contrived.

Certain ones of the devices are rigid structures supported by the bumper or, in the alternative, jointly by the bumper and the body panel of the vehicle. Being immovable, the devices are best suited for mounting upon the front of the vehicle as specifically suggested by the devisers.

Spare tire carriers, especially adapted for stowing the tire adjacent the rear panel of the body of the vehicle, are ordinarily of the movable or repositionable type. Most vehicles, whether of the power driven or towed variety, regularly include an access door or tailgate within the rear panel. The repositionable feature of the carrier is a necessary inclusion to accommodate use of the door.

A relatively simple, yet well known unit, incorporates a pair of angularly disposed arms. The free end of each arm is hingedly affixed to the body of the vehicle. Means for detachably securing a spare tire are carried at the apex of the arms. Rotation of the device, between stowed or normal position and the door access position, is about a vertical axis.

The foregoing type of carrier rotates within a horizontal plane, a highly desirable feature. Also, the devices are relatively inexpensive. Accordingly, a substantial degree of commerical success has been achieved. However, the configuration has proven to be less than entirely satisfactory. A primary deficiency concerns the mounting upon the body. Vehicular body panels are commonly fabricated of relatively lightweight material. The combined mass of the carrier and the tire, constantly vibrating when the vehicle is underway, imparts stress and fatigue to the body panel resulting in eventual material failure.

Other schemes, wherein the carrier utilizes the rear bumper of the vehicle, have also been proposed. Being of relatively heavy material and an extension of the frame, the bumper is well adapted as a weight and stress accommodating member. The various proposals have not, however, provided adequate remedy; and in certain instances, have introduced further shortcomings. Exemplary is the carrier which is primarily supported by the bumper but still requires a body mounted latch for retaining the spare tire in the normal position. Considerable stress is placed upon the latch as a result of the inherent instability of the pivotal attachment to the bumper. The device can be used only with vehicles having a very specific style of rear bumper. Further, the mounting requires extraordinary modification to the bumper.

Other bumper mounted units are pivotal about a horizontal axis. For access to the rear door, or tailgate, the tire is lowered to a position in which the carrier extends horizontally rearward from the vehicle. As such, the spare tire presents an access impeding obstacle. Additionally, the user is required to lift the combined weight of the carrier and the tire in order to return the assembly to the normal position.

It would be highly advantageous, therefore, to remedy the foregoing and other deficiencies inherent in the prior art.

Accordingly, it is an object of the present invention to provide an improved spare tire carrier for vehicles.

Another object of the invention is the provision of a spare tire carrier which is securable to the bumper or frame of the vehicle.

And another object of the invention is to provide a spare tire carrier which normally holds the spare tire in close parallel proximity to an upright panel of a vehicle.

Still another object of the instant invention is the provision of a carrier which is exclusive of the body of the vehicle.

Yet another object of the invention is to provide a carrier in which all weight and stress is borne by the frame of the vehicle.

Yet still another object of this invention is the provision of a spare tire carrier which is pivotal about an upright axis.

A further object of the invention is to provide a carrier having improved latch means for holding the spare tire in the normal position.

And a further object of the immediate invention is the provision of improved means for mounting a spare tire upon a spare tire carrier.

And still a further object of the invention is to provide a spare tire carrier that is readily securable to the conventional bumper of a vehicle.

Yet still a further object of the invention is the provision of a carrier according to the above which is durably yet simply constructed.

SUMMARY OF THE INVENTION

Briefly, to the achieve the desired objects of the instant invention in accordance with a preferred embodiment thereof, first provided is a mounting bracket which is securable to a frame member of a vehicle. For purposes of orientation in connection with the instant invention, the bumper is considered to be an extension of the frame. An elongate support arm is hingedly affixed at one end to the mounting bracket for rotation about an upright axis. Attachment means for detachable securement of a spare tire is carried at the free end of the support arm. Latch means retain the support arm in a normal position in which the spare tire is substantially parallel with a body panel of the vehicle.

More particularly, the latch means includes a latch plate carried by the frame member and having an opening therein. A bolt, carried by the support arm, is receivable within the opening of the latch plate when the spare tire is in the normal position. Biasing means, which may be in the form of a helical spring encircling the bolt, normally urges the bolt in a direction to engage the opening of the latch plate. A handled lever, rotatable about a fulcrum, opposes the biasing means to withdraw the bolt from the opening within the latch plate.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings, in which:

FIG. 1 is a partial perspective view of the rear portion of a vehicle, chosen to be typically representative, and having a spare tire carrier constructed in accordance with the teachings of the instant invention secured thereto;

FIG. 2A is a fragmentary, vertical, sectional view taken along the lines 2A—2A of FIG. 1, the carrier being shown in the locked position;

FIG. 2B is a view generally corresponding to the view of FIG. 2A, the apparatus being shown in the release position;

FIG. 2C is another view generally corresponding to the view of FIG. 2A and showing the device in a rotatably obtained alternate position;

FIG. 3A is a fragmentary, top plane view, generally corresponding to the view of FIG. 1, and having a spare tire attached thereto;

FIG. 3B is a view generally corresponding to the view of FIG. 3A and having the carrier in the position generally illustrated in FIG. 2C; and FIG. 4 is a fragmentary, side elevation view of the lower portion of a spare tire carrier embodying the principles of the instant invention and especially showing alternate means for attachment to the bumper of a vehicle, portions thereof being broken away for purposes of illustration.

DETAILED DESCRIPTION OF THE PREFERRED EMBODIMENTS

Turning now to the drawings in which like reference characters indicate corresponding elements throughout the several views, attention is first directed to FIG. 1 which illustrates a vehicle, generally designated by the reference character 10, having body 12 with upright panel 13. Door 14, affixed to upright panel 13 by means of hinges 15, provides access to the interior of body 12. Although only one hinge 15 is specifically illustrated, it will be appreciated by those skilled in the art that doors are usually affixed by two or more hinges. It will also be appreciated that doors of the immediate type are frequently secured by a continuous hinge.

Bumper 17, having face 18, extends laterally across body 12 at the lower portion of upright panel 13. Bumper 17, in accordance with standard construction, is fabricated of substantially thicker, stronger material than body 12 and is directly or indirectly secured to the main frame of the vehicle. Accordingly, bumper 17, for the immediate purposes, is considered a frame member.

The foregoing description of vehicle 10, set forth for purposes of orientation and reference, is intended to be typical of conventional vehicles such as vans, pick-up trucks and derivative recreational vehicles and certain towed vehicles. Body 12 may also be representative of a camper of the type normally fitted to a pick-up truck. Various minor modifications and variations will readily occur to those skilled in the art. For example, access to body 12 may be by means of a tailgate hingedly affixed to rear panel 13 by a hinge along the lower edge thereof. With regard to the instant invention, all such vehicles are considered to be analogous.

With further reference to FIG. 1, there is seen a spare tire carrier, generally designated by the reference character 20, affixed to vehicle 10. Being representative of the teachings of the instant invention, spare tire carrier 20 includes mounting bracket 22, support arm 23, and latch means 24.

In accordance with the immediate embodiment, mounting bracket 22 includes plate 25 which is secured to face 18 of bumper 17 by means of bolts 27. As further viewed in FIG. 4, plate 25 includes inner and outer surfaces 28 and 29, respectively. Openings 30, formed as by drilling, extend through plate 25 to accommodate bolts 27. Corresponding openings 32 are formed through the bumper 17 for receiving bolts 27 which are secured on the backside of the bumper 17 by nuts 33. As will be appreciated by those skilled in the art, openings 30 are performed while openings 32 are formed at the time of installation utilizing bracket 22 as a templates for location.

Surface 28 of plate 25 opposes the bumper 17. In the mounting configurations specifically illustrated in FIG. 1, surface 28 is received against face 18 of bumper 17. Seen in FIG. 4 are alternate means wherein bumper 17a has an irregular face 18a. In the immediate embodiment, upper and lower spacers 34 and 35, respectively, are provided. Each spacer includes a first, or inner, end contoured to be received in juxtaposition against face 18a. The outer ends of the spacers lie in a single plane to support plate 25 in a substantially upright position.

Referring again to FIG. 1, support arm 23 is illustrated as having first and second angularly disposed sections 37 and 38, respectively. Preferably fabricated of rectangular tubing, support arm 23 includes top surface 39, undersurface 40, front surface 42, and rear surface 43. Undersurface 40 and rear surface 43 being best viewed in FIG. 2A and FIG. 4, respectively. The several surfaces are continuous throughout first section 37 and second section 38. Top surface 39 is angular having a transverse apex 44 at the junction of first section 37 and second section 38.

Support arm 23 extends between fixed end 45 and free end 46. Plate 47 is affixed to free end 46. More specifically, in accordance with the immediately preferred embodiment, plate 47 is affixed to rear surface 43 of support arm 23 and normally lies in the plane of plate 25. Plate 47 is affixed to plate 25 by hinge 48. Analogous to a conventional butt hinge, hinge 48 includes a plurality of aligned cylindrical elements 49, alternating elements being affixed to plate 25 and to plate 47. Pin 50 extends through the several cylindrical elements 49 to provide an axis of rotation. In accordance with the immediate embodiment, pin 50 is in the form of a bolt and nut whereby arm 23 is rendered removable from vehicle 10.

Attachment means for detachable securement of a spare tire are carried at free end 46 of support arm 23. Preferably, the attachment means includes a generally circular plate 52 having face side 53 and carried by support member 54 extending upwardly outwardly from front surface 42 proximate free end 46 of support arm 23. An arcuate rest 56 and several threaded studs 55 project from face side 53 of circular plate 52. Arcuate rest 56 is a section of a cylinder which is generally concentric with the approximate center of circular plate 52. Threaded studs 55 are spaced about a bolt circle which is also concentric with the approximate center of circular plate 52.

The mounting portion of the rim of a tire, although not herein specifically illustrated, is familiar to those skilled in the art. A circular opening, for normally accommodating the hub of the axle, is located at the center of the rim. Circumscribing the circular opening and concentric therewith, are a plurality of smaller openings for accommodating the lug bolts. Threaded studs 55 are spaced to be received through the lug bolt openings. Arcuate rest 56 projects through the circular hub opening and provides means for supporting the spare tire while it is manually rotated for alignment with threaded studs 55. Depending upon the configuration of the rim, it may be necessary that arcuate rest 54 projects a greater distance from face 53 than threaded studs 55.

Latch means 24, as best viewed in FIG. 2A, includes latch plate 57 having opening 58 therethrough. For purposes of mounting to bumper 17, latch plate 57 is affixed, as by welding, to mounting plate 59. Mounting plate 59 is affixed to face 18 of bumper 17 by bolts 27 as previously described in connection with mounting bracket 22. Latch plate 57 projects from mounting plate 59 at an orientation such that surface 60 thereof lies in substantial juxtaposition with undersurface 40 of first section 37 of support arm 23.

Bore 62 extends through support arm 23, between surfaces 37 and 40, in alignment with opening 58 in latch plate 57. Pin 63 is slidably disposed within bore 62. Pin 63 terminates with head 64 spaced from surface 37 and terminal portion 65 extending from surface 40. Disk 67 is radially affixed to pin 63 intermediate the ends thereof. Compression type coil spring 68, coaxial about pin 63, bears against disk 67 to normally urge pin 63 in the direction of arrowed line A whereby terminal portion 65 projects from surface 40 to penetrate opening 58 of latch plate 57 to retain support arm 23 in the normal position.

Latch means 24 also includes handle 70 having elongate shank 72 with hand grip 73 at one end thereof and spade-like element 74 with down-turned free end 75 at the other end thereof. Pin 63 is loosely received through opening 78 in spade-like element 74, which resides between surface 37 of arm 23 and head 64 of pin 23. In response to the urging of spring 68 in the direction of arrowed line A, down-turned free end 75 bears against surface 37. It is noted that apex 44 resides on the underside of shank 72 at an intermediate location, preferably closer to the end defined by spade-like element 74.

Shank 72 functions as a lever. Apex 44 functions as a fulcrum. In response to pressure exerted upon hand grip 73 in the direction of arrowed line B, as seen in FIG. 2B, shank 72 pivots about apex 44 lifting down-turned end 75 of spade-like element 74 from surface 37. Accordingly, pin 63 is moved in the direction of arrowed line C, compressing spring 68 and withdrawing terminal portion 65 from opening 58 in latch plate 57. Arm 23 is now free to be rotated in the direction of arrowed line D, as seen in FIG. 2C, about the axis E of hinge 48 for access to door 14.

As seen in FIG. 3A, support arm 23 as well as the spare tire 80 carried thereby are parallel to upright panel 13 of vehicle 10 when the carrier of the instant invention is in the normal position as previously illustrated in FIGS. 1 and 2A. Axis E is substantially upright, being parallel to panel 13. During movement of the spare tire carrier of the instant invention to the access position, as viewed in FIG. 3B, spare tire 80 rotates in a substantially horizontal plane.

Various changes and modifications to the embodiment herein chosen for purposes of illustration will readily occur to those skilled in the art. For example, support arm may be fabricated of round tubing or other known structural shapes. Similarly the handled lever can assume various configurations and achieve the intended purpose. Also the several mounting plates may be alternately configured to mate with the contours of selected bumpers. To the extent that such modifications and variations to not depart from the spirit of the invention, they are intended to be included within the scope thereof which is assessed only by a fair interpretation of the following claims.

Having fully described and disclosed the instant invention, and alternately preferred embodiments thereof, in such clear and concise terms as to enable those skilled in the art to understand and practice the same, the invention claimed is:

1. A spare tire carrier for use in combination with a vehicle, which vehicle includes
   an upright body panel, and
   a frame member extending along said body panel and having a face surface,
   and for detachably supporting a spare tire, which spare tire includes
   a central hub opening, and
   a plurality of attachment openings spaced about said hub opening,
   and for supporting said tire for movement about an upright axis with the stress therefrom borne by said frame member, said spare tire carrier comprising:
   a. a mounting bracket securable to said frame member;
   b. a support arm having
      i. a first end hingedly coupled to said mounting bracket for rotation of said support arm about an upright axis, and
      ii. a free end having attachment means for detachable securement of said spare tire;
   c. latch means for selectively retaining said support arm in a normal position in which said spare tire is substantially parallel with said body panel, said latch means comprising
      i. a latch plate carried by said frame member and having an opening therein; and
      ii. a bolt carried by said support arm and receivable within the opening of said latch plate when said spare tire is in said normal position;

d. biasing means normally urging said bolt in a first direction to penetrate the opening within said latch plate;
e. release means for selectively moving said bolt in a second direction to withdraw said bolt from the opening within said latch plate, said release means comprising
  i. a lever having a fixed end coupled with said bolt and a free end defining a handle, and
  ii. a fulcrum carried by said support arm intermediate the ends of said lever, said lever being rotatable about said fulcrum in response to pressure applied to said handle for moving said bolt in said second direction.

2. The spare tire carrier of claim 1, wherein said mounting bracket includes a surface receivable against the face surface of said frame member.

3. The spare tire carrier of claim 2, further including a support plate hingedly coupled to said mounting bracket and carrying the fixed end of said support.

4. The spare tire carrier of claim 3, wherein said support plate resides in juxtaposition with the face surface of said frame member intermediate said mounting bracket and said latch plate when said spare tire is in said normal position.

5. The spare tire carrier of claim 1, wherein said support arm extends obliquely upward from said fixed end and includes an undersurface.

6. The spare tire carrier of claim 5, wherein:
a. said latch plate resides in juxtaposition with the undersurface of said support arm when said spare tire is in said normal position; and
b. said bolt is reciprocatively movably carried by said support arm and includes a terminal portion projectable from the undersurface of said support arm for penetration into the opening in said latch plate.

7. The spare tire carrier of claim 1, wherein said attachment means includes:
a. attachment means carried by said support arm and coupleable with a selected one of said plurality of attachment openings for detachably securing said spare tire to said support arm; and
b. a rest carried by said support arm and receivable through said central hub opening and rotatably supporting said spare for alignment of said selected one of said attachment openings with said attachment means.

* * * * *